United States Patent Office 3,058,888
Patented Oct. 16, 1962

3,058,888
PROCESS FOR PRODUCING α-ISOLEUCINE
Ichiro Chibata, Toyonaka, Masahiko Kisumi, Higashi-nada-ku, Kobe, and Yoshitaro Ashikaga, Toyonaka, Japan, assignors to Tanabe Seiyaku Co., Ltd., Osaka, Japan
No Drawing. Filed Oct. 31, 1960, Ser. No. 65,922
Claims priority, application Japan Oct. 30, 1959
8 Claims. (Cl. 195—29)

This invention relates to a process for producing L-isoleucine by fermentation, more particularly to a process for producing L-isoleucine by fermentation with bacteria of the genus Pseudomonas on a nutrient medium containing α-aminobutyric acid.

L-isoleucine is one of the essential amino acids and its importance has been recognized with the advance of biochemistry and physiological research in recent years. Economical supply of this essential amino acid has been earnestly wanted in the pharmaceutical field and for food enrichment. However, there has been no advantageous or practical method for the production of L-isoleucine up to the present. Thus, according to a known chemical synthesis of isoleucine, four stereoisomers are formed. Consequently, for the production of biologically active L-isoleucine, a troublesome procedure is required to separate the useful compound from the mixture of the isomers. It has been proposed to isolate the amino acid from natural substance, but it is very difficult to separate the amino acid from other contaminating amino acids.

Meanwhile, a fermentative process has been employed in the industrial production of some amino acids such as glutamic acid and lysine. As far as L-isoleucine is concerned, however, there has been only one report by Hayashi et al. [Amino Acids (Japan) 1, 91 (1959)], that L-isoleucine was produced at the level of only about 5 mg./ml. in a nutrient medium containing α-aminobutyric acid with a bacteria belonging to the genus Bacillus.

We have found that with an α-aminobutyric acid-containing medium as in the above method, the yield of L-isoleucine is remarkably improved when a bacteria belonging to a quite different genus from that used in the above method is employed.

It is an object of the invention to provide an improved and advantageous process for preparing L-isoleucine from an α-aminobutyric acid-containing medium by fermentation. It is another object of the invention to prepare L-isoleucine by the fermentation with bacteria of the genus Pseudomonas. A further object of the invention is to improve the yield of L-isoleucine as compared with heat attained in the fermentation with a bacteria of genus Bacillus as above described. Still another object of this invention is to provide a commercially practicable procedure for preparing L-isoleucine by fermentation method.

We have discovered that a fermentative production of L-isoleucine is advantageously carried out in higher yield with a bacteria belonging to the genus Pseudomonas in a nutrient medium containing α-aminobutyric acid. According to this invention, L-isoleucine can be produced in a yield of more than 8 mg./ml. and sometimes even as high as 12–14 mg./ml., with *Pseudomonas aeruginosa* MO and *Pseudomonas fluorescens* 6009–2.

L-isoleucine was also obtained in the same yield by the other several strains belonging to genus Pseudomonas, such as *Pseudomonas aeruginosa* HO, *Pseudomonas fluorescens* A13–12, *Pseudomonas Miyamizu* and *Pseudomonas gelidicola*.

In carrying out the fermentation according to this invention a medium of the ordinary composition containing such ingredients as glucose, peptone, yeast extract, corn steep liquor, urea and mineral salts can be used except that α-aminobutyric acid is indispensable. It has been found, however, that a medium containing from 1 to 3 percent of α-aminobutyric acid and from 5 to 15 percent of glucose is particularly preferable.

As a nitrogen source, from 0.5 to 2 percent of ammonia salts or urea may preferably be used. The addition of commonly used organic nitrogen source such as peptone, yeast extract, meat extract and corn steep liquor favors the production of L-isoleucine. Inorganic salts such as potassium phosphate, magnesium sulfate and calcium carbonate, and ferrous sulfate may be added, if necessary.

It is desirable that the pH of the medium is kept at 5.0–9.0 during the fermentation. The fermentation is carried out for from 2 days to 10 days at a temperature between 27° and 40° C., the most preferable temperature being at about 30° C. Although the fermentation is carried out with or without shaking, shaking favors L-isoleucine production.

After the fermentation L-isoleucine may be isolated from the filtered broth by any suitable ordinary separation procedure which is well-known to those skilled in the art. Thus, for example, an ion exchanger can be employed. More particularly, for instance, a filtered culture broth is passed through or treated with a cation exchange resin, such as Dowex-50 so that L-isoleucine is absorbed on the resin. Then, the resin is subjected to an elution with a dilute alkali solution to eluate L-isoleucine therefrom. The eluate is passed through a column of a weak cation exchange resin, such as Amberlite IRC-50, which does not absorb the L-isoleucine and the effluent is concentrated.

Crude crystals of L-isoleucine can be obtained by adding alcohol to the concentrated solution. Additional purification of this crude L-isoleucine is then carried out by recrystallization with alcohol and water.

The following examples are given solely for the purpose of illustration and are not to be construed as limitations of this invention, many variations of which are possible without departing from the spirit or scope thereof.

*Example 1*

Slant culture of *Pseudomonas aeruginosa* MO was carried out for 24 hours at 30° C. on the following medium which had previously been sterilized by autoclaving for 10 minutes at 15 pounds/square inch pressure:

| | Percent |
|---|---|
| Peptone | 1 |
| Yeast extract | 1 |
| Meat extract | 1 |
| NaCl | 0.3 |
| Agar | 1.5 |

The pH was adjusted to 7.0 with sodium hydroxide. Another medium was prepared for actual preparation of L-isoleucine. The medium had the following composition:

| | Percent |
|---|---|
| α-Aminobutyric acid | 1 |
| Glucose | 10 |
| Yeast extract | 0.35 |
| Peptone | 0.2 |
| $K_2HPO_4$ | 0.1 |
| $MgSO_4 \cdot 7H_2O$ | 0.05 |
| Urea | 1 |
| $CaCO_3$ | 1 |

25 ml. of the medium were introduced into a 500 ml. shaking flask and were autoclaved for 10 minutes at 15 pounds/square inch pressure. To this medium 2 loopfuls of the inoculum were added. The culture was carried out at 30° C. with shaking (110 r.p.m.). After 7 days, the broth was assayed as having a L-isoleucine content of 8 mg./ml.

Example 2

Pseudomonas aeruginosa NK was grown for 24 hours at 30° C. on the same medium described in Example 1 to obtain an inoculum. Medium was prepared for actual preparation of L-isoleucine. The medium had the following composition:

| | Percent |
|---|---|
| α-Aminobutyric acid | 1 |
| Peptone | 0.2 |
| Glucose | 10 |
| Yeast extract | 0.35 |
| $K_2HPO_4$ | 0.1 |
| $MgSO_4 \cdot 7H_2O$ | 0.05 |
| $FeSO_4 \cdot 7H_2O$ | 0.005 |
| Urea | 1 |
| $CaCO_3$ | 1 |

25 ml. of the medium were introduced into a 500 ml. shaking flask and were autoclaved for 10 minutes at 15 pounds/square inch pressure. To this medium 2 loopfuls of the inoculum were added. The culture was carried out at 37° C. with shaking. After 5 days, the broth was assayed as having a L-isoleucine content of 8 mg./ml.

Example 3

Pseudomonas fluorescens 6009-2 was grown for 24 hours at 30° C. on the nutrient medium described in Example 1 to obtain an inoculum. Medium was prepared for actual preparation of L-isoleucine. This medium had the following composition:

| | Percent |
|---|---|
| α-Aminobutyric acid | 1 |
| Glucose | 10 |
| Peptone | 0.2 |
| Yeast extract | 0.35 |
| $K_2HPO_4$ | 0.1 |
| $MgSO_4 \cdot 7H_2O$ | 0.05 |
| Urea | 0.5 |
| $CaCO_3$ | 1 |

25 ml. of the medium were introduced into a 500 ml. shaking flask and were autoclaved for 10 minutes at 15 pounds/square inch pressure. 2 loopfuls of the inoculum were added to the production medium. The fermentation was carried out at 30° C. without shaking. After 6 days, the broth was filtered off to remove the cells of Pseudomonas fluorescens 6009-2. The filtrate was assayed as having a L-isoleucine content of 7 mg./ml.

Example 4

Pseudomonas aeruginosa MO was grown for 25 hours at 30° C. on the nutrient medium described in Example 1 to obtain an inoculum. Medium was prepared for actual preparation of L-isoleucine. The medium had the following composition:

| | Percent |
|---|---|
| α-Aminobutyric acid | 2 |
| Glucose | 15 |
| Corn steep liquor | 1.1 |
| $K_2HPO_4$ | 0.1 |
| $MgSO_4 \cdot 7H_2O$ | 0.05 |
| Urea | 1.5 |
| $CaCO_3$ | 1 |

25 ml. of the medium were introduced into a 500 ml. shaking flask and were autoclaved for 10 minutes at 15 pounds/square inch pressure. To this medium 2 loopfuls of the inoculum were added. The culture was carried out at 30° C. with shaking. After 5 days, the broth was assayed as having a L-isoleucine content of 14 mg./ml. The L-isoleucine was separated by ion exchange treatment.

We claim:

1. A process for the preparation of L-isoleucine which comprises fermenting with an organism selected from the group consisting of Pseudomonas aeruginosa, Pseudomonas fluorescens, Pseudomonas Miyamizu and Pseudomonas gelidicola in a nutrient medium containing from 1 to 3 percent of α-aminobutyric acid at a temperature within the range of from 27° to 40° C., thereby accumulating L-isoleucine in the fermentation broth.

2. A process according to claim 1, wherein the organism is Pseudomonas aeruginosa HO.

3. A process according to claim 1, wherein the organism is Pseudomonas aeruginosa MO.

4. A process according to claim 1, wherein the organism is Pseudomonas aeruginosa NK.

5. A process according to claim 1, wherein the organism is Pseudomonas fluorescens 6009-2.

6. A process according to claim 1, wherein the organism is Pseudomonas fluorescens A13-12.

7. A process according to claim 1, wherein the organism is Pseudomonas Miyamizu.

8. A process according to claim 1, wherein the organism is Pseudomonas gelidicola.

No references cited.